US008130277B2

(12) United States Patent
Jayachandra et al.

(10) Patent No.: US 8,130,277 B2
(45) Date of Patent: Mar. 6, 2012

(54) METHOD AND SYSTEM FOR INTELLIGENT AND EFFICIENT CAMERA MOTION ESTIMATION FOR VIDEO STABILIZATION

(75) Inventors: Dakala Jayachandra, Chittor (IN); Gunupudi Nageswararao, Vijaywada (IN); Rongali Satya Vara Prasad, Bangalore (IN); Ramkishor Korada, Bangalore (IN); Sunil Koteyar, Bangalore (IN); Ruturaj Anand Chandpur, Bangalore (IN)

(73) Assignee: Aricent Group, George Town (KY)

( * ) Notice: Subject to any disclaimer, the term of this patent is extended or adjusted under 35 U.S.C. 154(b) by 451 days.

(21) Appl. No.: 12/390,203

(22) Filed: Feb. 20, 2009

(65) Prior Publication Data
US 2009/0237516 A1   Sep. 24, 2009

(30) Foreign Application Priority Data
Feb. 20, 2008   (IN) .............................. 430/DEL/2008

(51) Int. Cl.
| H04N 5/228 | (2006.01) |
| G06K 9/36 | (2006.01) |
| G06K 9/46 | (2006.01) |
| H04N 7/12 | (2006.01) |
| H04N 11/02 | (2006.01) |
| H04N 11/04 | (2006.01) |

(52) U.S. Cl. .................. 348/208.1; 382/236; 375/240.16

(58) Field of Classification Search ............. 348/208.99, 348/208.1, 208.4, 208.5, 208.6; 382/236; 375/240.16
See application file for complete search history.

(56) References Cited

U.S. PATENT DOCUMENTS

| 5,748,231 | A | * | 5/1998 | Park et al. | ................ 348/207.99 |
| 6,628,711 | B1 | * | 9/2003 | Mathew et al. | .......... 375/240.12 |
| 7,221,390 | B1 | * | 5/2007 | Kutka | ........................ 348/208.4 |
| 7,605,845 | B2 | * | 10/2009 | Batur | ........................ 348/208.6 |
| 7,852,375 | B2 | * | 12/2010 | Vella et al. | ............... 348/208.99 |
| 2006/0066728 | A1 | * | 3/2006 | Batur | ....................... 348/208.99 |

* cited by examiner

Primary Examiner — Kelly L Jerabek
(74) Attorney, Agent, or Firm — John T. Whelan (57) ABSTRACT

Disclosed herein is a method for global motion estimation for video stabilization. The method enables selecting a video frame from a video stream. The method further enables downscaling the video frames by factor close to 2 in a two dimensional range, dividing the downscaled video frame into a plurality of macroblocks, performing motion estimation for the macroblocks to generate a set of local motion vectors. Further, the method enables selecting macroblocks representing global motion vectors from the set of local motion vectors, computing a single global motion vector for the selected macroblocks and determining occurrence of at least one of: scene change, illumination change or crossing object and modifying the single global vector to compensate for errors induced due to occurrence of at least one of: scene change, illumination change or crossing object.

27 Claims, 6 Drawing Sheets
(2 of 6 Drawing Sheet(s) Filed in Color)

METHOD AND SYSTEM FOR INTELLIGENT AND EFFICIENT CAMERA MOTION ESTIMATION FOR VIDEO STABILIZATION

BACKGROUND OF THE INVENTION

1. Field of the Invention

The present invention generally relates to the field of digital video processing, and more particularly, to methods and systems for providing an intelligent and efficient camera motion estimation for video stabilization.

2. The Relevant Technology

Video (moving pictures or sequence of images\frames) captured by 'cameras mounted on a moving vehicle or a robot', 'Hand holding, light weight video camcorders or mobile phones' suffers from 'JITTERS' or 'SHAKES'. Video normally consist of motion, including object motion, such as a bird flying, and camera motion, such as camera panning, zooming, and tilting. Other than natural motion of an object or camera, the video camera may record unwanted motion. The term "unwanted" usually refers to camera motion frequently resulting from hand jittering or from physical movement of a person capturing video. Other unwanted motion may include, for example, wind shakes a mounted camera or a vehicle carrying a camera traverses rough terrain etc. This unwanted motion might result in blurred or displaced frames thereby degrading the quality of video.

Holding a camera stable, while capturing a video is almost an impossible task. Video captured with such unavoidable camera shakes will result in annoying visual shakes/jitter in video. So some means to remove such unwanted camera motion in video becomes inevitable. Video stabilization is such a technology that avoids jitter in video either while capturing or after capture. Camera motion estimation is important and critical for any efficient video stabilization.

Camera motion can be estimated with mechanical systems (using motion sensors) and software systems (by digital signal processing). Mechanical systems for camera motion estimation are more robust compared to the software based counter parts. But mechanical systems are costly and increase the physical size of the system. Range of motion, the mechanical stabilizers can correct, is limited by the movement of lens system and hence presents some disadvantages. Also, the reaction time is limited by physical factors and cannot be too quick. On the other hand the amount of motion that can be corrected is adjustable in software-based solutions. Software solutions have the advantage that they facilitate compact designs (More demand for sleek, compact and handy devices) and they make any further up-gradations easier. Software solutions offer much flexibility and reusability for video stabilization. This shows a that software-based solution for hand held cameras has advantages over the mechanical systems.

With the convergence of technology and applications, "Camera phones" with full-fledged video processing capabilities are expected to play a predominant role in the next generation communications dominated by Video. There has been an ever-increasing demand for "sleek camera phones" and with such sleek models it becomes very difficult to hold them stable in hands to capture video. State of art solutions for video stabilization is suffering from its in-ability to process video data in real-time on handheld and battery operated devices. Camera\Global motion estimation for a video sequence requires robust estimation of global (or camera) motion in spite of various disturbances like high local motion; crossing objects, capture noise, illumination changes, etc. Present technologies still suffer from trade-offs in accuracy and complexity. Hence the "video stabilization" to remove the inevitable un-wanted jitter resulting in the video captured with such handy devices, becomes mandatory. This in turn demands for camera motion estimation either by sensing the movement of the lenses by motion sensors or by studying the content motion from frame to frame in software.

Thus there is a need for a fast and accurate, less complex camera motion estimation technique for practical implementation of video stabilization on mobile devices that overcomes the afore-mentioned shortcomings.

SUMMARY OF THE INVENTION

These and other drawbacks and limitations are overcome by embodiments of the present invention, which relates to systems and methods for intelligent and efficient camera motion estimation for video stabilization. The present invention proposes a technique that estimates camera motion accurately from the local motion of 16×16 blocks of a frame that is scaled down version of actual frame at a given instant of time The camera motion is estimated from a histogram based techniques where in the histogram of local motion is computed and reliable peaks of it are used to estimate the same. Compared to the techniques in literature, which takes either some fixed regions of the video frames or distorted versions of the video frames (binary bit-planes, one dimensional vectors, etc) for motion estimation, the selection of blocks that actually represent global motion is a key feature of the present invention.

It is a principal object of the present invention to provide a method and system for camera motion estimation for video stabilization with a low complexity. Embodiments of present invention include a computer readable media comprising a set of instructions which causes a processor based system to select a video and downscale frames of the video by a factor close to two in a two dimensional plane along both the horizontal and vertical components. Integrating a noise removal filter while downscaling the video. The downscaled images are then divided into a plurality of macroblocks which results into generation of local motion vectors. The local motion vectors are isolated to track macroblocks representing global motion vectors. A determining of occurrence of scene change, illumination change or crossing object is done to compensate the global motion vector for errors induced due to occurrence of scene change, illumination change or crossing object.

In one embodiment of the present invention, the methods and systems for the global motion estimation for video stabilization is used in real time.

It is yet another object of the present invention to provide a method and system, where histogram based techniques is used to estimate camera motion.

It is still another object of the present invention to provide motion estimation by selecting the blocks that actually represent global motion. The present techniques intelligently chooses the blocks that represents the global motion and eliminates that represents local motion and other motion disturbances, in which it eliminates unnecessary computation complexity for global motion estimation. The reliability of global motion vector so generated is verified against other parameters to account disturbance that mislead the camera motion estimation.

It is another object of the present invention to eliminate unnecessary computational complexity for global motion estimation by intelligently choosing the blocks that represents the global motion. The key feature of our invention is the "Block selection process", which studies the previous frames local motion vector distribution and tries to select the blocks in the areas that represent the camera motion. The block selection process is a regenerative process based on "the confidence with which the global motion is estimated" and "the number of blocks selected for motion estimation out of all possible blocks". This process adaptively tries to converge to a minimum number of blocks sufficient for estimating the camera motion with high confidence and if the confidence is going down then increases the blocks. In this process it eliminates any local objects motion and makes the camera motion estimation more robust to such local disturbances. It can be noted that "the block selection" process reduces the complexity significantly and at the same time making camera motion estimation more accurate. This is a significant value add in the field of camera motion estimation compared the motion estimation methods based on predefined fixed regions in the input images.

It is still another object of the present invention to provide a method and system to intelligently detect natural disturbances, but not limited to, illumination change, scene change, crossing large objects. This intelligence of the global motion estimation system to cope up with these more natural disturbances is the key factor for the success of the software based video stabilization systems.

It is yet another object of the present invention to provide a method and system for making camera motion estimation robust to noise and at the same time keeping the complexity at minimal. These and other novel features of the invention will become apparent from following detailed description of the invention when considered in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention is now described with reference to the drawings. While explaining various aspects and features of the present invention, like reference numerals are used to refer to like elements and\or structures. Like reference numerals shows the usage of like element in various embodiments of the inventions. The figures, drawings and block diagrams used to explain various embodiments of the present invention are for explanatory purpose and are not limiting of the present invention.

Figure 1:
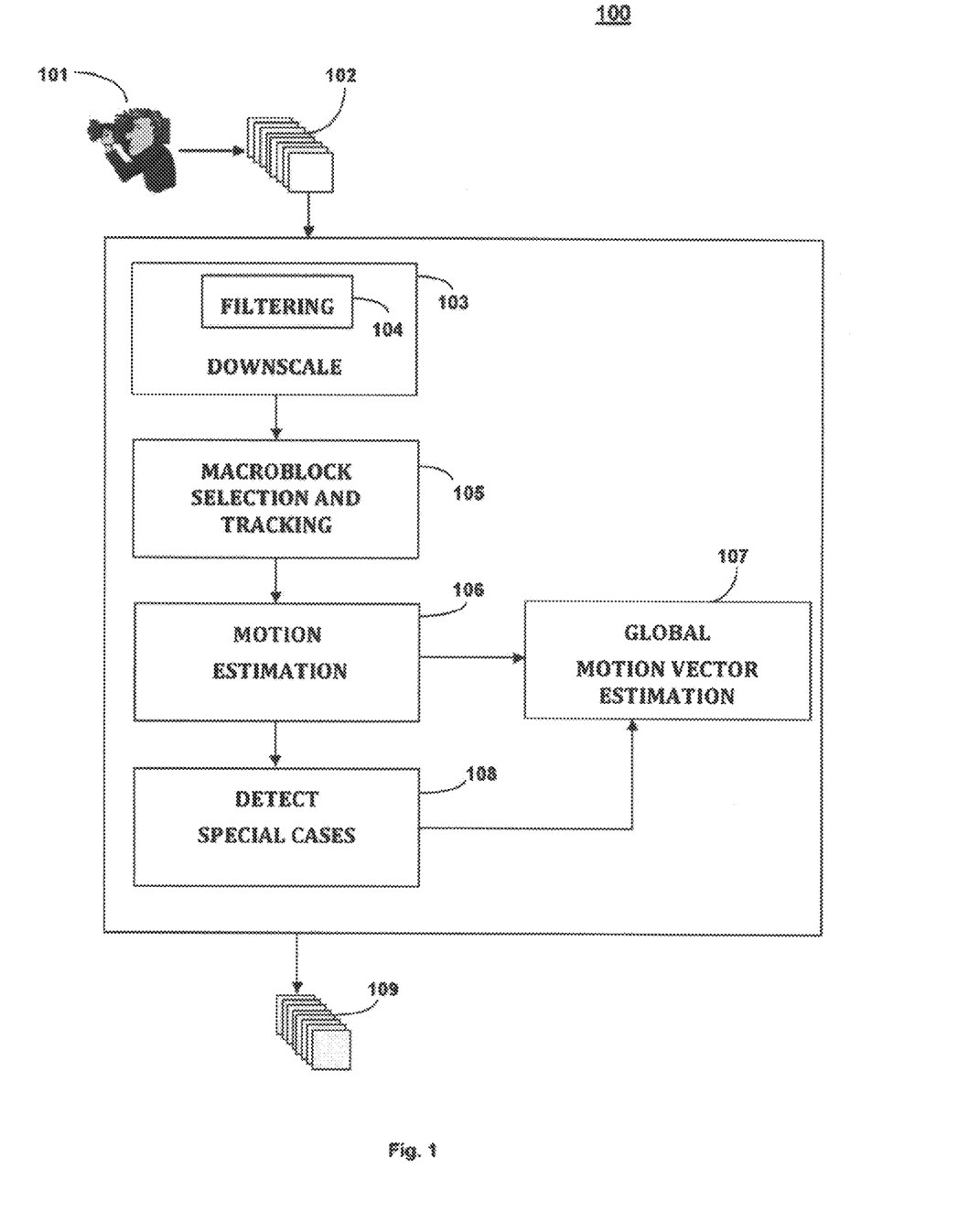
FIG. 1 illustrates an exemplary view of the present invention.

Referring to FIG. 1, there is illustrated an exemplary view of the present invention with various modules used for explaining various embodiments of the invention. An electronic device 101 capable of capturing video, captures pictures\images which are subjected to systems and methods described in the present invention for camera motion estimation for video stabilization. The electronic device 101 can be, not limited to though, a mobile camera, a hand held camera, a movable camera, a fixed camera, a camera mounted on a fixed\movable device, a mean for capturing still or motion pictures and likes. For purpose of simple and easy description of the present invention, term 'video' and 'video images' have been used interchangeably for explaining various embodiments of the invention. Similarly, term 'camera motion' and 'global motion' have been used interchangeably for explaining the present invention in a simple and easy way. It would be evident to one skilled in the relevant art, however that the invention can be practiced with still or moving images\pictures. The still or moving images\pictures captured by the electronic device 101 comprises of video images 102. The video images 102 are input to downscale module 103, which performs downscaling of the input video images 102.

A high frequency noise may affect the video images 102 captured by the electronic device 101 or may get embedded in the captured video images 102. The high frequency noise will affect accuracy of motion estimation for the captured video images 102 and thus the high frequency noise needs to be removed. The high frequency noise can be, not limited to though, jitters or shocks caused by movement of the electronic device 101, crossing objects, illumination changes and likes. The input images should be filtered for eliminating noise. To alleviate this problem, input video images are generally filtered using a separate noise removal filter for eliminating noise. The filtering process adds considerable complexity. To reduce the high frequency noise affecting the motion estimation accuracy, the input video images 102 should be pre-processed with noise removal filters. Performing any filtering on input images increases the complexity considerably. The present invention proposes to use the filtering process along with downscaling. Using only the downscaled images for motion estimation reduces the complexity of motion estimation.

The downscale module 103 has a filtering module 104 to filters the high frequency noise associated with the video images 102 captured by the electronic device 101. The video images 102 are downscaled, by the downscale module 103, by a factor close to 2 in both directions (X and Y coordinates of a two dimensional plane). The filtering module 104 integrates a noise removal filter while the downscale module 103 performs the downscaling process. The present invention uses downscaled video frames for motion estimation in place of actual video frames 102 and integrates a noise removal filter in the downscaling process thereby reducing the complexity. The filtering module 104, which resides in the downscale module 103, performs filtering on the downscaled video frames 102 to eliminate the random high frequency noise while the downscaling module 103 performs the downscaling of the video frames 102 to reduce the over all complexity. Usually during the downscaling process, the video frames 102 are padded with edge pixels in each X and Y direction. Instead of padding with edge pixel, in present invention, the downscaling ratio is chosen in such way that the extra pixels required for motion estimation beyond frame boundaries also get selected. This way of downscaling increases the accuracy of motion estimation.

The downscaled frames are divided into a plurality of macroblocks of equal size of 16×16 each and motion estimation is performed for these macroblocks resulting in a pool of local motion vectors. The local motion vectors are estimated up to half-pixel resolution in the downscaled frames. Out of all the macroblocks for motion estimation, not all represents global/camera motion. Some macroblocks may represent local objects motion i.e. motion resulting due to large objects crossing the camera, local objects motion, illumination changes and likes. It's highly important to eliminate/track these blocks that represent local objects to make global motion estimation robust against local objects. The macroblock selection and tracking module 105, isolate the macroblocks representing camera motion and the macroblocks whose motion is not aligned with camera motion i.e. macroblocks that represent local objects. Further, it eliminates the macroblocks that represent local objects for accurate motion estimation. Further, global motion vectors and camera motion vectors both represent vector motions associated with macroblocks representing noise free video frames. The selection of macroblocks representing global motion and elimination of macroblocks representing local motion is based on the behavior of the macroblocks. The macroblocks exhibits very high correlation from one frame to another i.e. macroblocks following camera motion in a current frame will also follow the camera motion in the next frame with high probability.

Consider, for example, the video captured by the electronic device 101 comprises of sequence of video frames 102 representing both global motion and local motion (due to sudden crossing of, not limited to though, a double-decker bus). Clearly, if these regions are not excluded from the motion estimation then there is high probability that the object's motion is treated as camera motion. Further, merely adding a selection process to pick some macroblocks out of the pool of macroblocks representing global motion might affect motion estimation accuracy over the time. The selection of global motion vectors and elimination of local motion vectors by the macroblock selection and tracking module 105, is based on a measure called 'confidence' The measure 'confidence' is defined as the percentage of macroblocks whose motion vectors are same as global motion vectors in estimating the X component of global motion vector (Confidence_X) and in estimating Y component of global motion vector (Confidence_Y) separately. In other words, the measure 'confidence' is defined as the percentage of macroblocks out of the selected macroblocks representing global motion vectors. The macroblock selection and tracking module 105, implements a regenerative algorithm based on the 'confidence' and the total number of macroblocks selected for motion estimation, the regenerative algorithm would either add some macroblocks or discard some macroblocks for motion estimation. The regenerative algorithm can be summarized as:

---

If ((Confidence_X > 70%) || (Confidence_Y > 70%))
    If (number of macroblocks selected > 40% of the total macroblocks generated)
Discard 10% of number of macroblocks selected for next frame. Choose the 10% of macroblocks that are spatially placed at equal distance in the available macroblocks for discarding.
    Other wise
     Select MB's with highest neighborhood of macroblocks representing global motion vector
Other wise
    Select MB's with highest neighborhood of macroblocks representing global motion vector.

---

The motion estimation module 106 carries out motion estimation for each of the macroblocks selected by the macroblock selection and tracking module 105. The motion estimation module 106 uses a modified spatio-temporal motion vector correlation based algorithm tailored to the requirements of motion estimation for video stabilization. The modified spatio-temporal motion vector correlation based algorithm first selects spatial and temporal predictors. The algorithm then tries to identify best predictor out of the selected spatial and temporal predictors. Finally, the algorithm performs a search using the selected best predictor as a start point. The algorithm is highly efficient as compared to full-search algorithms. Moreover, using the modified spatio-temporal motion vector correlation based algorithm, macroblocks up to half pixel accuracy can be estimated. The selection of temporal and spatial predictors is an important aspect of the algorithm.

Figure 2:
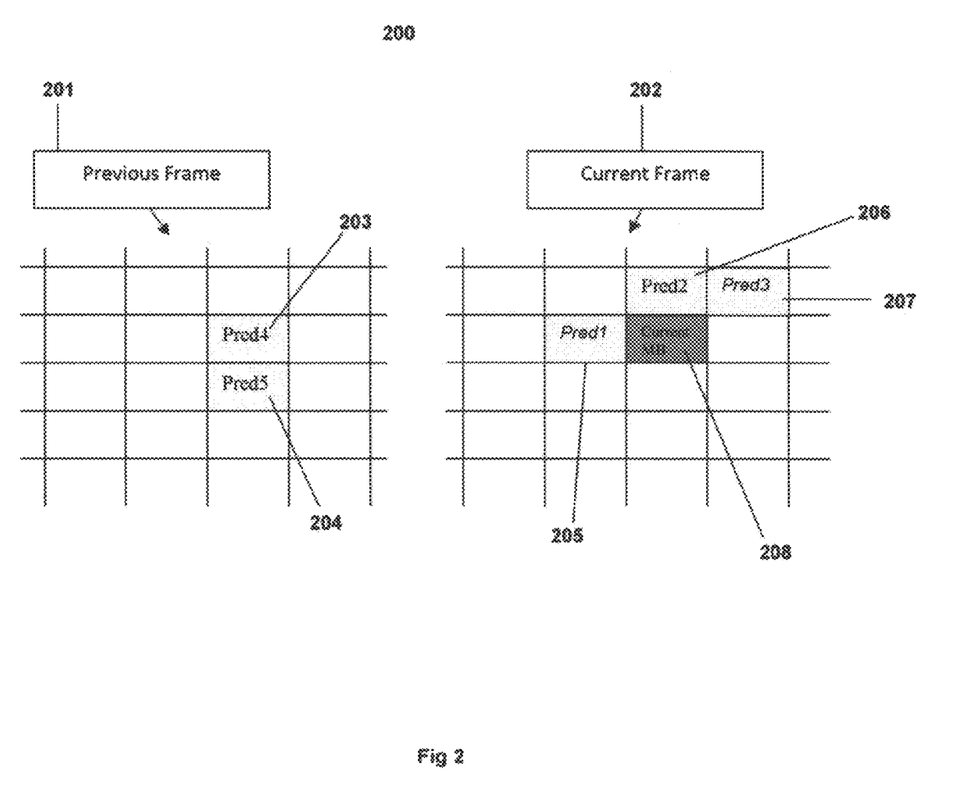
FIG. 2 illustrates selection of spatial and temporal predictors for local motion estimation.

FIG. 2 illustrate selection of temporal and spatial predictors for local motion estimation. Initially, both spatial and temporal fixed neighboring macroblocks' motion vectors are considered as initial predictors. Spatial predictors 211, 212 and 213 of current frame 202 are selected from spatially surrounding macroblocks and temporal predictors 203 and 204 are selected from previous frame 201. The temporal predictors 203 and 204 from previous frame 201 are given very less priority and are selected only when spatial predictors 211, 212 and 213 of frame 202 are not available. Spatial predictors 211, 212 and 213 are selected assuming spatially neighboring macroblocks will exhibit similar kind of motion characteristics. In cases where the spatial predictors 211, 212 and 213 are not available, then the available nearby macroblocks' motion vectors are used as predictors. Using the regenerative macroblock selection algorithm, macroblocks representing camera motion are selected, not all the times these fixed location spatial predictors will be available. In such cases where the spatial predictors 211, 212 and 213 are not available, then the available near by macroblocks' motion vectors are used as predictors. As the macroblocks regeneration algorithm selects macroblocks that represent camera motion, though these available nearby macroblocks may not spatially adjacent to the current macroblock, still with high probability the current macroblock and the predictor will exhibit similar motion characteristics. With such selection of initial predictors the motion search algorithms exhibits faster convergence and thus reducing the number of calculations required for motion estimation.

Referring back to FIG. 1, global motion vector estimation module 107 extracts a motion vector from the pool of the local motion vectors, which will provide the best global inter frame translation motion the best. If all the blocks identified during the motion estimation represent global motion vector, then there is no need for detecting special cases which affects and misleads the global motion estimation. In such a case, the global motion vector estimation module 107 can easily estimate the global motion vector (GMV). The following options are the common methods available to estimate the global motion vector (GMV) from a pool of local motion vectors (LMV):

1. Using the most frequent local motion vector as GMV.
2. Using the mean of the 'N' most frequent local motion vectors as GMV.
3. Using Median of local motion vectors as GMV.

Among these, "The most frequent local motion vector as GMV" is found to be best suited, as most of the blocks display similar amount of translation.

In case, if all the blocks identified during the motion estimation does not represent global motion vector, then there is a need for detecting special cases which will affects and misleads the global motion estimation. Detect special cases module 108 is required for detecting special cases which affects and misleads the global motion estimation. To intelligently safeguard the stabilization, the module 108 detects special cases like 'Scene changes', 'Illumination changes', 'Large crossing objects', 'highly blurred images' etc. For detecting these special cases, the present invention uses some parameters named "local motion vector (LMV) spread around global motion vector (GMV)", "Percentage Of Intra macroblocks'", "Percentage Of static blocks", and "Confidence levels" These metrics can be easily, without any additional complexity, can be determined from the process performed by motion estimation module 106. If scene change is detected then the whole stabilization process is reset and the current global motion vector is initialized to zero. Otherwise if any of the other cases is detected, then based on the status of the camera motion the global motion vector is either predicted from the previous global motion vector or Zero motion vector. For predicting these cases the following parameters are used:

LMV_Spread around GMV: This is defined for both X and Y components separately as follows.

$$\text{Spread}\_X = \Sigma[abs(LMV_i(x) - GMV(x))] \text{ for } i=0 \text{ to } N.$$

$$\text{Spread}\_Y = \Sigma[abs(LMV_i(y) - GMV(y))] \text{ for } i=0 \text{ to } N.$$

Where N=Number of MB's considered for ME.

LMV_Spread indicates how much local block motion vectors are correlated or how similar they are. If say, all the blocks have same motion then the LMV_Spread will be zero indicating very high correlation between the local motion vectors. On the other hand if there are any local objects moving out of band with camera motion, then the motion vectors of the blocks covering these local objects will increase the LMV_Spread.

Percentage Of Intra macroblocks: This is defined as $$\text{Percentage of IntraMB's} = (\text{Number of IntraMB's}/N)*100$$

Where N=Number of MB's considered for ME.

Each MB is decided as IntraMB in the motion estimation process if its IntraSAD is less than the InterSAD. The IntraSAD is calculated as the sum of absolute differences between the mean of the block and each pixel of the block.

Percentage Of static blocks: This is defined as $$\text{Percentage of Static Blocks} = (\text{Number of Static Blocks}/N)*100$$

Where N=Number of MB's considered for ME.

Each MB is decided as static block if it has zero motion vectors with InterSAD less than StaticSADThreshold.

Confidence levels: The confidence levels for both X and Y components is defined as follows:

$$\text{Confidence}\_X = ((\text{No. Of MB's whose } LMV(x) == GMV(x))/N)*100$$

$$\text{Confidence}\_Y = ((\text{No. Of MB's whose } LMV(y) == GMV(y))/N)*100$$

Where N=Number of MB's considered for ME.

In the global motion vector (GMV) prediction algorithm, if scene change is detected, then the whole stabilization process is reset to initial conditions to treat the upcoming sequence as a new sequence all together. Otherwise if any of the other special cases are detected, then GMV is decided UN-RELIABLE for both X and Y components separately. Once if X and/or Y of the GMV are decided as UN-RELIABLE, then they are predicted from the previous GMV. All these conditions are threshold-based conditions and the thresholds are decided experimentally. The intelligence to distinguish/safeguard camera motion from these natural disturbances is the key factor for the effective software video stabilization systems. One more important feature of this global motion vector (GMV) prediction algorithm is that all the parameters (LMV_Spread, Percentage of IntraMB's, Percentage of Static Blocks and Confidence levels) used in the prediction process are calculated using "IntraSAD", "InterSAD", "LMV's" and "GMV" which are available directly from the motion estimation process performed by motion estimation module 106 and hence doesn't demand for any additional complexity.

Figure 3:
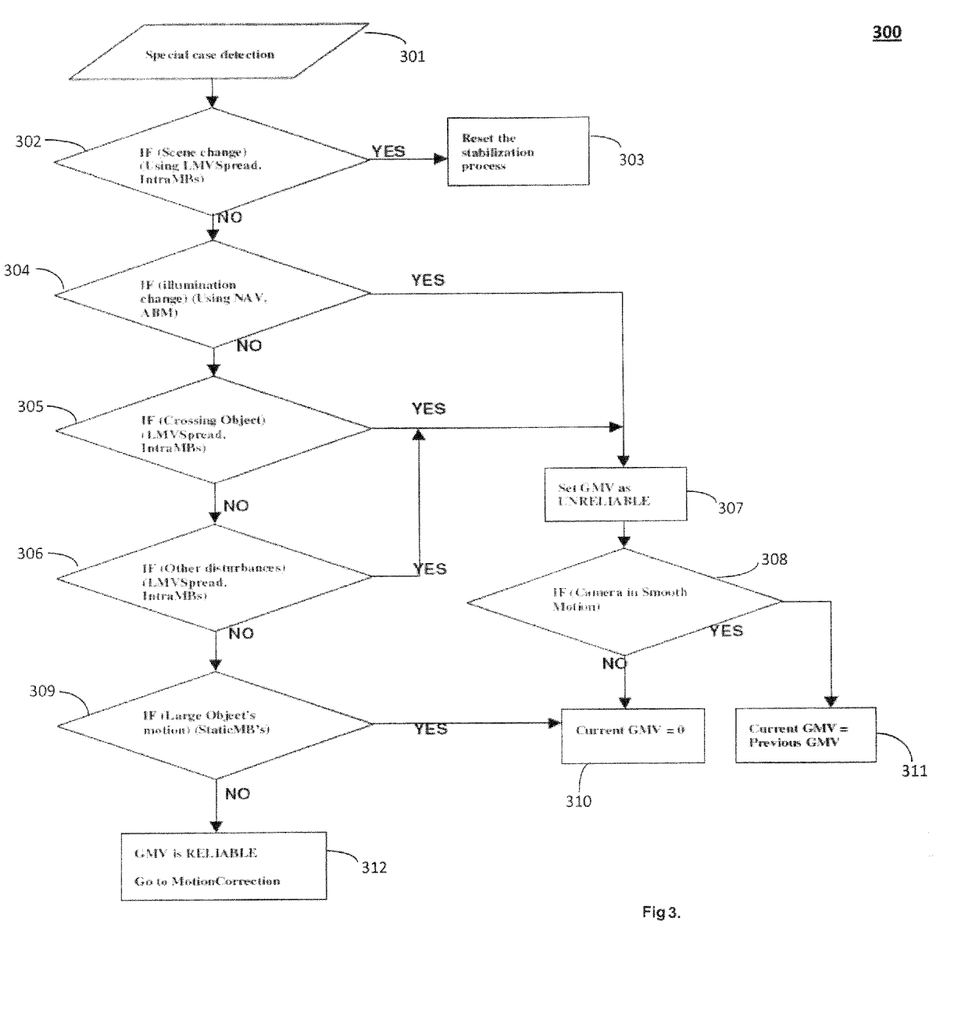
FIG. 3 illustrates an exemplary flow diagram for detecting special cases ('illumination change', 'crossing object', 'local object motion' etc) for predicting global motion vector.

FIG. 3 illustrates a flow diagram 300 for a method of predicting global motion vector (GMV) along with parameters used to predict a particular scenarios. Method 300 includes at 301 receiving a request for detecting special cases like 'Scene changes', 'Illumination changes', 'Large crossing objects', 'highly blurred images' etc. At 302 a determination of scene change is made using LMV_Spread and IntraMBs. Whenever a scene change occurs, the correlation between the current frame and previous frame falls drastically. Moreover, in case of a scene change, as two subsequent video frames are not related by any kind of motion the local motion vectors will get spread so randomly or they will not exhibit any uniform motion. If a scene change is detected then at 303 the whole stabilization process is reset to initial conditions to treat the upcoming sequence as a new sequence all together. The algorithm for detecting scene change is as follows:

```
IF (the number of MB's having Intra SAD less than Inter SAD) > (30% of
the number of MB's considered for motion estimation) AND
IF (the spread of the local motion vectors around the GMV) > (9 * the
number of MB's considered),
    Then,
        This is a Scene change.
            Otherwise
        This is not a Scene change.
ENDIF
ENDIF
```

If there is no scene change, the video frames at 304 are checked for an illumination change. Illumination changes in the captured video frame sequence can be due to an external illumination changes from time to time, changes in gain and offset of the image capture device or changes in the angle of incidence of light rays due to the 3-D motion of the object. For accurate detection of illumination change in an image, parameters that are invariant to the illumination changes and directly vary with illumination change are essential. But the statistical parameters chosen should not be affected by other disturbances in the image like motion of objects, noise in the image, and scene changes. Also defined are simple statistical parameters, average normalized block variance (ANBV) and average block mean (ABM) for a video frame as follows.

Average Normalized Block Variance (ANBV):

ANBV=$\Sigma V_n$ for n=1 to N, where N=Number of blocks in the video frame and $V_N$, the normalized block variance, is defined as, Normalized Block Variance $$V_N = \frac{\sqrt{\Sigma(x - M_N)2}}{M_N},$$

where $M_N$ is the mean of block under consideration and is defined as,

Block Mean $$M_N = \frac{\sum_{N,N} xij}{N * N}$$

Average Block Mean (ABM):
ABM=$\Sigma M_n$ for n=1 to N, where N=Number of blocks in the video frame and $M_N$ is the block mean defined above.

It is observed that the normalized variance of a block of a small size (less than 32×32) is highly independent of illumination changes in that block. And mean of a block varies with amount of illuminations. Thus tracking the normalized variance and average block mean can identify the illumination change_provided that there is no significant local object and/or global motion. But when a considerable motion is involved from previous frame to current one the ANV and ABM might be disturbed. For example if a local object has significant motion, based on its new position in the frame the variances of the blocks occupied by the object will vary drastically. If there is an illumination change than at 307 the global motion vector (GMV) is decided UN-RELIABLE for both X and Y components separately. Once if X and/or Y of the GMV are decided as UN-RELIABLE, then they are predicted from the previous GMV's. Using the changes in ANBV and ABM from frame to frame, illumination change can be detected as follows:

```
IF (Change in ANBV <= Thresh1) AND (Change in ABM > Thresh2),
    Then
        "This is an Illumination change"
    Otherwise
        IF (((Change in ANBV <= Thresh3) AND (Change in ABM >
        Thresh2))
                AND (CONFIDENCE_GMV > SufficentThr)
            Then
                "This is an Illumination change"
            Otherwise
                "This is not an Illumination change"
        ENDIF
ENDIF
```

Figure 4:
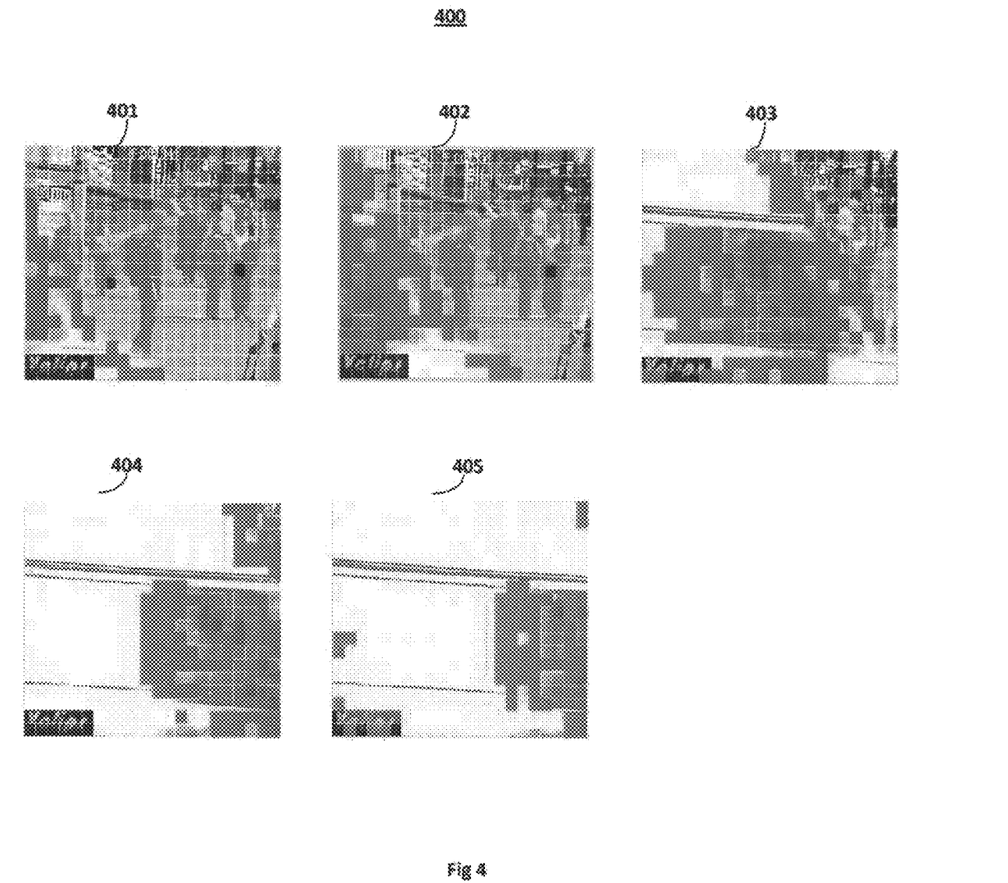
FIG. 4 illustrates an exemplary view on behavior of macroblocks and their correlation when an object enters the vicinity of video capturing device.

If there is no illumination change, the video frames at 305 are checked for noise resulting from a crossing object using parameters like LMV_Spread and IntraMBs. When an object enters the vicinity of the camera, the pixels covered by the so said object will lose the correlation with the pixels in the previous frame. This result in IntraMBs in those regions the object has entered. Referring to FIG. 4 which illustrates nature of IntraMBs (shown in Green). Consider for example, at 401 (say at video frame 134 of a sequence of video frames) the behavior of pixels of a video frame as a result of an object entering the video frame. At 402, 403, 404 and 405 depicts behavior of pixels of a video frame at video frame 135, 135, 140 and 141 of the same sequence of video frame due to motion of the crossing object.

Figure 5A:
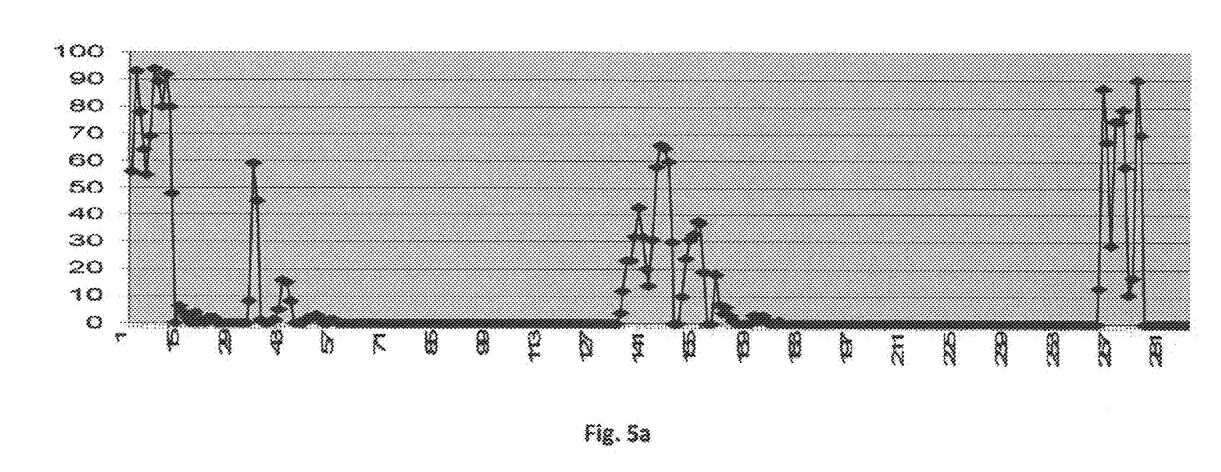
FIG. 5a illustrates a graph depicting percentage of IntraMB's during crossing object.

Referring to FIG. 5a which illustrate nature of IntraMBs reveals information about an object crossing the camera at a decent speed. From the percentage of IntraMBs plotted in FIG. 5a for video frame 135, 135, 140 and 141 reveals consistent rise in IntraMBs whenever there is an object crossing. The graph has been plotted for video frames 0 to 15, 134 to 150, and 268 to 277.

Figure 5B:
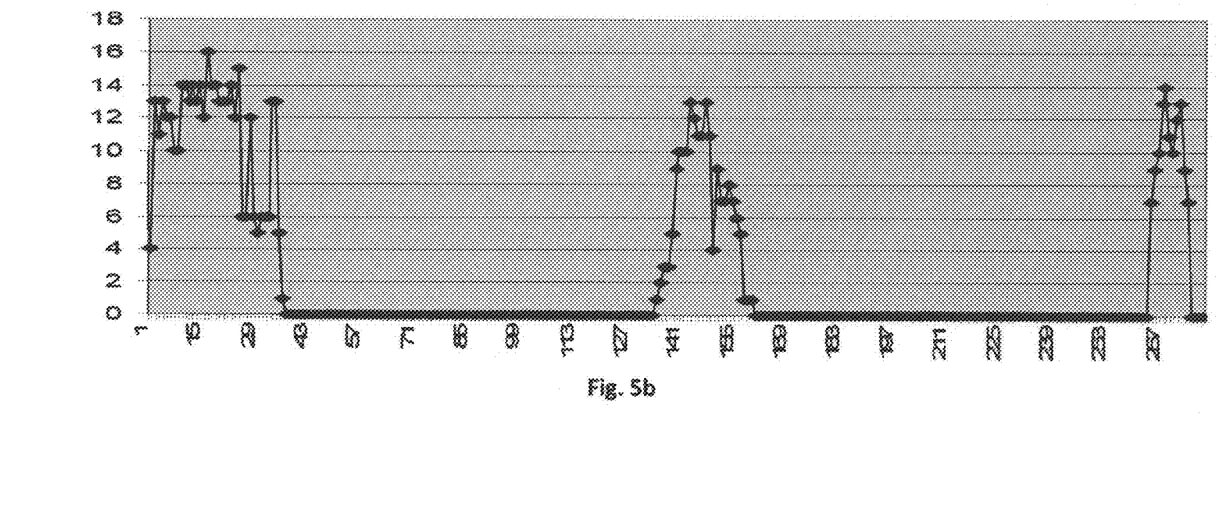
FIG. 5b illustrates a graph depicting spread of local motion vectors during crossing objects.

Referring to FIG. 5b which illustrate spread of local motion vectors during the object crossing the camera. As the local motion estimation may not get proper match for the regions covered by a crossing object (which is moving at a decent speed), the spread of local motion vectors (LMVs) around global motion vector (GMV) would also display a similar kind of behavior as that of IntraMB's during object crossings. The graph of FIG. 5b displays the LMV_Spread for video frames 0 to 15, 134 to 150, and 268 to 277.

The determination of an object crossing a camera can be made using LMV_Spread or using Number of IntraMBs. Based on LMV_Spread:

```
If ((LMVSpread > StartThresholdLMV) OR (LMVSpread >
SufficientThreLMV))
    This is a Crossing Object!!
If (LMVSpread < EndThresholdLMV)
    End of a Crossing Object!!
```

Based on Number of IntraMB's:

```
If ((PerOfIntraMBs > StartThresholdIntraMB) OR (PerOfIntraMBs >
SufficientThreIntraMB))
    This is a Crossing Object!!
If (PerOfIntraMBs < EndThresholdIntraMB)
```

Wherein, StartThrehsold is a point when the disturbance is becoming objectionable and triggers that one can assume occurrence of a crossing object. SufficientThreshold indicates a minimum disturbance sufficient to assume that a crossing object is still prevailing. EndThreshold is a disturbance below which the disturbance is any more objectionable to the camera motion estimation.

Referring again to FIG. 3, if a crossing object is detected than at 307 the global motion vector (GMV) is decided UN-RELIABLE for both X and Y components separately. Once if X and/or Y of the GMV are decided as UN-RELIABLE, then they are predicted from the previous GMV's. If no crossing object is detected, the video frames at 306 are checked for noise resulting from other disturbances like image blurring. For such a case if a determination is made at 308. If the camera motion is smooth, the current GMV is set equal to previous GMV. At 309, detection of large object's motion is done. Whenever a large object is being captured, and there is no intended camera motion, the dominant motion introduced by the motion of the large object will disturb the stabilization process. These cases are predicted by observing the occurrence of StaticBlocks (those MB's with (0,0) MV and InterSAD<StaticBlkThresh) in the regions not covered by the object. So whenever the percentage of static blocks rises beyond a threshold, at 310 the GMV is assumed as zero (i.e. no camera motion). At 312 a determination is made that no special case was detected and the previously computed GMV is set to reliable.

Figure 6:
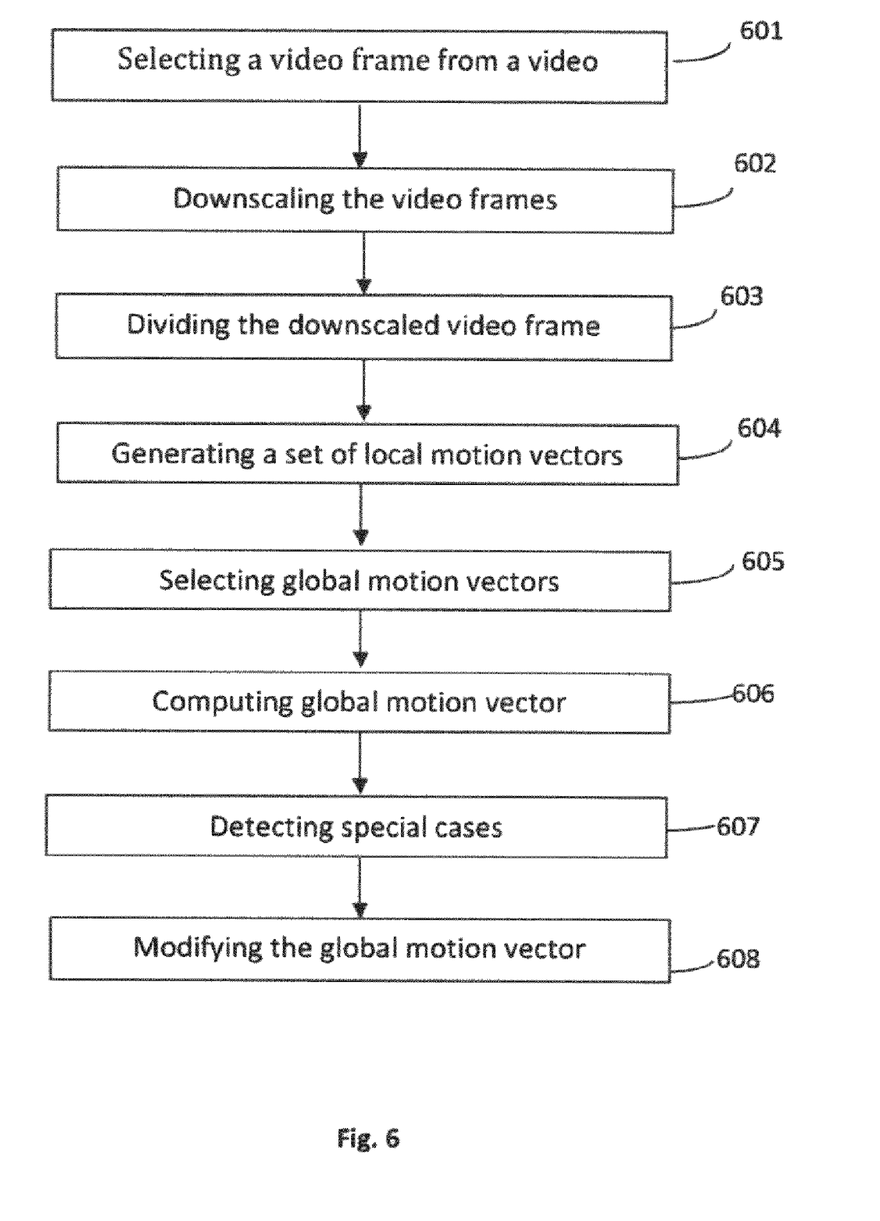
FIG. 6 illustrates an exemplary flow diagram of the present invention.

FIG. 6 illustrates a flow diagram 600 for a method of implementing camera motion estimation for video stabilization. Method 600 includes at 601 selecting a video frame from a sequence of video frames captured by an electronic capturing device. An indication for selection of video frames at 601 includes a text, a keystroke, a physical force or any other means to initialize the selection of video frames. Method 600 further includes at 602 downscaling the video frames by factor close to 2 in along both X and Y directions for motion estimation in place of actual frames and integrates a noise removal filter in the downscaling process. At 603 the downscaled video frames are divided into a plurality of macroblocks of equal size of 16×16 each and motion estimation is performed for these blocks. The division of macroblocks into plurality of macroblocks results in a pool of local motion vectors at 604. The generated pool of local motion vectors will also include vectors representing camera motion. It is important to isolate these camera motion vectors for motion estimation. At 605 based on the behavior of macroblocks which exhibits very high correlation from one frame to another, the global motion vectors are selected. Further, the invention uses a regeneration algorithm for selecting macroblocks representing global motion vectors. Macroblock selection is based on the fact that macroblocks following the camera motion in the current frame will also follow the camera motion in the next frame with high probability. The method 600 also includes at 606, performing motion estimations for the selected motion vectors representing camera motion. For motion estimation, motion vectors up to half pixel accuracy are estimated using modified spatio-temporal motion vector correlation based algorithm.

There are some special cases, like "Crossing objects", "Illumination changes", "local object motion", "blurred regions", etc, whose motion vectors will interfere with the stabilization process. So they need to be biased during the calculation of global motion vector. At 607, determination of occurrence of scene change, illumination change, crossing object and other like disturbances is done. Based on the occurrence of scene change, illumination change, crossing object and other like disturbances, the global motion vector is predicted at 608. In the global motion vector prediction, if scene change is detected, then the whole stabilization process is reset to initial conditions to treat the upcoming sequence as a new sequence all together. Otherwise if any of the other special cases are detected, then global motion vector is decided unreliable for both X and Y components separately. Once if X and/or Y of the global motion vector are decided as unreliable, then they are predicted from the previous global motion vector.

Those skilled in the art will appreciate that the invention may be practiced in network computing environments where video capturing devices and a processor based system executing the present invention are linked (either by hardwired links, wireless links, or by a combination of hardwired or wireless links) through a communications network. The network computing environment may consists of electronic devices like computer system configurations, including personal computers assistants, hand-held devices, multiprocessor systems, microprocessor-based or programmable consumer electronics, network PCs, minicomputers, mainframe computers, and the like. The invention may also be practiced in distributed computing environments. Moreover, it should also be understood that the embodiments within the scope and spirit of the invention may also include computer-readable media for carrying or having computer-executable instructions or data structures for camera motion estimation for video stabilization.

Thus systems and methods for camera motion estimation for video stabilization have been described. It would be evident to person skilled in the art that various modification and changes may be made to the various aspects of the present invention without departing from the broad spirit and scope of the invention. Further, the described embodiments and the drawings are to be considered only as illustrative and not restrictive.

We claim:

1. A method for global motion estimation for video stabilization, the method comprising:
   selecting a video frame from a video stream;
   downscaling the video frame;
   dividing the downscaled video frame into a plurality of macroblocks;
   performing motion estimation for the macroblocks to generate a set of local motion vectors;
   selecting macroblocks representing global motion vectors from the set of local motion vectors;
   computing a single global motion vector for the selected macroblocks, the single global motion vector being one of a most frequented local motion vector out of the motion vectors, a median of local motion vectors and a mean of an integer number of most frequented local motion vectors;
   determining occurrence of at least one of scene change, illumination change or crossing object; and
   modifying the single global vector to compensate for errors induced due to occurrence of at least one of scene change, illumination change or crossing object.

2. The method of claim 1, wherein downscaling the video frame further comprises: simultaneously filtering the downscaled video frames to eliminate noise associated with the downscaled video frames.

3. The method of claim 1, wherein selecting macroblocks representing global motion vector from the set of local motion vectors further comprises:
   computing a confidence-factor as percentage of macroblocks representing global motion vectors out of plurality of macroblocks;
   discarding a subset of macroblocks selected for motion estimation when the confidence-factor is less than 70 percent, and the total number of the selected macroblocks are less than 40 percent of the plurality of macroblocks; and
   adding more macroblocks selected for motion estimation when the confidence-factor is less than 70 percent and the total number of the selected macroblocks are more than 40 percent of the plurality of macroblocks.

4. The method of claim 3, further comprising:
   selecting a first set of macroblocks representing a first video frame and a second set of macroblocks representing a second video frame;
   calculating a set of temporal predictors of the first set of macroblocks representing first video frame; and
   calculating a set of spatial predictors of the second set of macroblocks representing second video frame based on motion characteristics of the temporal predictors of the first set of macroblocks representing first video frame.

5. The method of claim 1, wherein determining occurrence of at least one of scene change, illumination change or crossing object can be done either individually or simultaneously for each of the video frames.

6. The method of claim 1, wherein the single global motion vector is most frequented local motion vector out of the motion vectors.

7. The method of claim wherein the single global motion vector is a median of local motion vectors.

8. The method of claim 1, wherein the single global motion vector is a mean of an integer number of most frequented local motion vectors.

9. The method of claim 1, wherein determining the occurrence of crossing object comprises:
   computing vector motion spread along X coordinate in a two dimensional plane by subtracting horizontal component of global motion vector from horizontal component of local motion vector; computing vector motion spread along Y coordinate in a two dimensional plane by subtracting vertical component of global motion vector from vertical component of local motion vector; and
   modifying the single global vector when the vector motion spread along X coordinate and the vector motion spread along Y coordinate is greater than a first threshold value that triggers occurrence of a crossing object.

10. The method of claim 1, wherein determining the occurrence of scene change comprises:
computing vector motion spread along X coordinate in a two dimensional plane by subtracting horizontal component of global motion vector from horizontal component of local motion vector;
computing vector motion spread along Y coordinate in a two dimensional plane by subtracting vertical component of global motion vector from vertical component of local motion vector; and
modifying the single global vector when the vector motion spread along X coordinate and the vector motion spread along Y coordinate is greater than a quantity generated by multiplying the number of macroblocks representing global motion vectors with numeral 9.

11. The method of claim 1, wherein determining the occurrence of illumination change comprises:
computing an average normalized block variance for macroblocks representing global motion vectors;
computing an average block mean for the macroblocks representing global motion vectors; and
modifying the single global vector when average normalized block variance for the macroblocks is less than a first threshold value and average block mean for the macroblocks is greater than the second threshold value.

12. The method of claim 1, wherein computing a single global motion vector for the selected macroblocks further comprises:
preparing a histogram for the macroblocks representing global motion vectors; and
selecting a motion vector from the histogram with highest peak for both X and Y coordinate individually in a two dimensional plane.

13. A system for global motion estimation for video stabilization and for use with a sequence of video frames, the system comprising:
a processor; and
a memory having a program stored therein and being operable to store the sequence of video frames therein,
wherein the program is executed by the processor to:
select a video frame from the sequence of video frames stored in the memory;
downscale the video frame and integrate a filter to simultaneously filter the downscaled video frames to eliminate noise associated with the downscaled video frames;
divide the downscaled video frame into a plurality of macroblocks;
perform motion estimation for the macroblocks to generate a set of local motion vectors;
select macroblocks representing global motion vectors from the set of local motion vectors;
compute a single global motion vector for the selected macroblocks, the single global motion vector being one of a most frequented local motion vector out of the motion vectors, a median of local motion vectors and a mean of an integer number of most frequented local motion vectors;
determine occurrence of at least one of scene change, illumination change or crossing object; and
modify the single global vector to compensate for errors induced due to occurrence of at least one of: scene change, illumination change or crossing object.

14. The system of claim 13, the program stored in the memory further comprises instructions for selecting macroblocks that represent global motion vector from the set of local motion vectors, these instruction when executed causes the processor to:
compute a confidence-factor as percentage of macroblocks that represent global motion vectors out of plurality of macroblocks;
discard a subset of macroblocks selected for motion estimation when the confidence-factor is less than 70 percent and the total number of the selected macroblocks are less than 40 percent of the plurality of macroblocks; and
add more macroblocks selected for motion estimation when the confidence-factor is less than 70 percent and the total number of the selected macroblocks are more than 40 percent of the plurality of macroblocks.

15. The system of claim 14, the program stored in the memory further comprises instructions that cause the processor to:
select a first set of macroblocks representing a first video frame and a second set of macroblocks representing a second video frame;
calculate a set of temporal predictors of the first set of macroblocks representing first video frame; and
calculate a set of spatial predictors of the second set of macroblocks representing second video frame based on motion characteristics of the temporal predictors of the first set of macroblocks representing first video frame.

16. The system of claim 13, wherein the single global motion vector is most frequented local motion vector out of the motion vectors.

17. The system of claim 13, wherein the single global motion vector is a median of local motion vectors.

18. The system of claim 13, wherein the single global motion vector is a mean of an integer number of most frequented local motion vectors.

19. The system of claim 13, the program stored in the memory further comprises instructions for determining occurrence of scene change, these instructions when executed causes the processor to:
compute vector motion spread along X coordinate in a two dimensional plane by subtracting horizontal component of global motion vector from horizontal component of local motion vector;
compute vector motion spread along Y coordinate in a two dimensional plane by subtracting vertical component of global motion vector from vertical component of local motion vector; and
modify the single global vector when the vector motion spread along X coordinate and the vector motion spread along Y coordinate is greater than a quantity generated by multiplying the number of macroblocks representing global motion vectors with numeral 9.

20. The system of claim 13, the program stored in the memory further comprises instructions for determining occurrence of crossing objects and modify the single global vector to compensate for errors induced due to occurrence of crossing object, these instruction when executed causes the processor to:
compute vector motion spread along X coordinate in a two dimensional plane by subtracting horizontal component of global motion vector from horizontal component of local motion vector:
compute vector motion spread along Y coordinate in a two dimensional plane by subtracting vertical component of global motion vector from vertical component of local motion vector; and modify the single global vector when the vector motion spread along X coordinate and the vector motion spread along Y coordinate is greater than a first threshold value that triggers occurrence of a crossing object.

21. The system of claim 13, the program stored in the memory further comprises instructions for determining occurrence of illumination change and modify the single global vector to compensate for errors induced due to occurrence of illumination change, these instruction when executed causes the processor to:

compute an average normalized block variance for macroblocks representing global motion vectors;

compute an average block mean for the macroblocks representing global motion vectors; and modify the single global vector when average normalized block variance for the macroblocks is less than a first threshold value and average block mean for the macroblocks is greater than the second threshold value.

22. The system of claim 13, the program stored in the memory further comprises instructions for selecting a single global motion vector for the selected macroblocks, these instruction when executed causes the processor of the computer to:

prepare a histogram for the macroblocks representing global motion vectors; and select a motion vector from the histogram with highest peak for both X and Y coordinate individually in a two dimensional plane.

23. A tangible device-readable media having device-readable instructions stored thereon, the device-readable instructions being capable of being read by a device, the device being operable to capture a sequence of video frames in real time, the tangible device-readable instructions being capable of instructing the device to perform the method, comprising:

selecting a video frame from a video stream;

downscaling the video frame:

dividing the downscaled video frame into a plurality of macroblocks of equal size;

performing motion estimation for the macroblocks to generate a set of local motion vectors;

selecting macroblocks representing global motion vectors from the set of local motion vectors, for each selected macroblocks:

selecting a first set of macroblocks representing a first video frame and a second set of macroblocks representing a second video frame, calculating a set of temporal predictors of the first set of macroblocks representing first video frame, and calculating a set of spatial predictors of the second set of macroblocks representing second video frame based on motion characteristics of the temporal predictors of the first set of macroblocks representing first video frame;

computing a single global motion vector for the selected macroblocks, the single global motion vector being one of a most frequented local motion vector out of the motion vectors, a median of local motion vectors and a mean of an integer number of most frequented local motion vectors;

determining occurrence of at least one of: scene change, illumination change or crossing object; and modifying the single global vector to compensate for errors induced due to occurrence of at least one of: scene change, illumination change or crossing object.

24. The tangible device-readable media of claim 23, wherein execution of the instructions further comprises:

computing a confidence-factor as percentage of macroblocks representing global motion vectors out of plurality of macroblocks;

discarding a subset of macroblocks selected for motion estimation when the confidence-factor is less than 70 percentage and the total number of the selected macroblocks are less than 40 percentage of the plurality of macroblocks; and adding more macroblocks selected for motion estimation when the confidence-factor is less than 70 percentage and the total number of the selected macroblocks are more than 40 percentage of the plurality of macroblocks.

25. A system for stabilizing a sequence of image frames captured by an electronic device, said system comprising:

a source for receiving the sequence of the image frames captured by the electronic device; and a processor coupled to said the source for and being operable to:

downscale the image frames;

divide the downscaled image frames into a plurality of macroblocks and filter the downscaled image frames to remove noise associated with the downscaled images;

generate a set of local motion vectors;

isolate macroblocks representing global motion vectors and local motion vectors from the set of local motion vectors;

compute a single global motion vector for the macroblocks representing global motion macroblocks, the single global motion vector being one of a most frequented local motion vector out of the motion vectors, a median of local motion vectors and a mean of an integer number of most frequented local motion vectors; and modify the single global vector to compensate for errors induced during capturing the sequence of the image frames.

26. The system of claim 25, wherein the errors are induced due to at least one of: scene change, illumination change or crossing object.

27. The system of claim 25, wherein the source receives the sequence of the image frames from a real time image source.

* * * * *